(12) United States Patent
Gammack et al.

(10) Patent No.: US 8,403,640 B2
(45) Date of Patent: Mar. 26, 2013

(54) FAN ASSEMBLY (75) Inventors: Peter David Gammack, Malmesbury (GB); James Dyson, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 599 days.

(21) Appl. No.: 12/716,742

(22) Filed: Mar. 3, 2010

(65) Prior Publication Data
US 2010/0226752 A1 Sep. 9, 2010

(30) Foreign Application Priority Data
Mar. 4, 2009 (GB) .................... 0903693.0

(51) Int. Cl.
F04D 25/08 (2006.01)
F04D 29/44 (2006.01)
F04F 5/20 (2006.01)
(52) U.S. Cl. .................. 415/211.2; 415/213.1; 415/224; 415/225; 415/226
(58) Field of Classification Search ............... 415/211.2, 415/212.1, 213.1, 224, 225, 226
See application file for complete search history.

(56) References Cited

U.S. PATENT DOCUMENTS

| | | | |
|---|---|---|---|
| 1,357,261 A | 11/1920 | Svoboda | |
| 1,767,060 A | 6/1930 | Ferguson | |
| 1,896,869 A | 2/1933 | Larsh | |
| 2,014,185 A | 9/1935 | Martin | |
| 2,035,733 A | 3/1936 | Wall | |
| D103,476 S | 3/1937 | Weber | |
| 2,115,883 A | 5/1938 | Sher | |
| D115,344 S | 6/1939 | Chapman | |
| 2,210,458 A | 8/1940 | Keilholtz | |
| 2,258,961 A | 10/1941 | Saathoff | |
| 2,336,295 A | 12/1943 | Reimuller | |
| 2,433,795 A | 12/1947 | Stokes | |
| 2,473,325 A | 6/1949 | Aufiero | |
| 2,476,002 A | 7/1949 | Stalker | |
| 2,488,467 A | 11/1949 | De Lisio | |
| 2,510,132 A | 6/1950 | Morrison | |
| 2,544,379 A | 3/1951 | Davenport | |
| 2,547,448 A | 4/1951 | Demuth | |
| 2,583,374 A | 1/1952 | Hoffman | |

(Continued)

FOREIGN PATENT DOCUMENTS

| | | |
|---|---|---|
| BE | 560119 | 8/1957 |
| CA | 1055344 | 5/1979 |

(Continued)

OTHER PUBLICATIONS

Gammack, P. et al., U.S. Office Action mailed Jun. 21, 2011, directed to U.S. Appl. No. 12/203,698; 11 pages.

(Continued)

Primary Examiner — Igor Kershteyn
(74) Attorney, Agent, or Firm — Morrison & Foerster LLP (57) ABSTRACT

A fan assembly for creating an air current includes an air inlet, an air outlet, an impeller and a motor for rotating the impeller to create an air flow passing from the air inlet to the air outlet. The air outlet includes an interior passage for receiving the air flow and a mouth for emitting the air flow. The air outlet defines an opening through which air from outside the fan assembly is drawn by the air flow emitted from the mouth. The motor has a rotor which, in use, is capable of rotating at a speed of at least 5,000 rpm.

18 Claims, 10 Drawing Sheets

U.S. PATENT DOCUMENTS

| | | |
|---|---|---|
| 2,620,127 A | 12/1952 | Radcliffe |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,541 A | 1/1980 | Beck et al. |
| 4,192,461 A | 3/1980 | Arborg |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,718,870 A | 1/1988 | Watts |
| 4,732,539 A | 3/1988 | Shin-Chin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger, IV |
| 5,061,405 A | 10/1991 | Stanek et al. |
| D325,435 S | 4/1992 | Coup et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,402,938 A | 4/1995 | Sweeney |
| 5,407,324 A | 4/1995 | Starnes, Jr. et al. |
| 5,425,902 A | 6/1995 | Miller et al. |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| D398,983 S | 9/1998 | Keller et al. |
| 5,841,080 A | 11/1998 | Iida et al. |
| 5,843,344 A | 12/1998 | Junket et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,065,936 A * | 5/2000 | Shingai et al. ................ 416/175 |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| D485,895 S | 1/2004 | Melwani |
| 6,789,787 B2 | 9/2004 | Stutts |
| 6,830,433 B2 | 12/2004 | Birdsell et al. |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,455,504 B2 * | 11/2008 | Hill et al. ................ 416/179 |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,664,377 B2 | 2/2010 | Liao |
| D614,280 S | 4/2010 | Dyson et al. |
| 7,775,848 B1 | 8/2010 | Auerbach |
| 7,806,388 B2 | 10/2010 | Junkel et al. |
| 8,092,166 B2 | 1/2012 | Nicolas et al. |
| 2002/0106547 A1 | 8/2002 | Sugawara et al. |
| 2003/0059307 A1 | 3/2003 | Moreno et al. |
| 2003/0171093 A1 | 9/2003 | Gumucio Del Pozo |
| 2004/0022631 A1 | 2/2004 | Birdsell et al. |
| 2004/0049842 A1 | 3/2004 | Prehodka |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0269323 A1 | 11/2007 | Zhou et al. |
| 2008/0020698 A1 | 1/2008 | Spaggiari |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0191054 A1 | 7/2009 | Winkler |
| 2009/0214341 A1 | 8/2009 | Craig |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |

| | | | | | | |
|---|---|---|---|---|---|---|
| 2010/0254800 | A1 | 10/2010 | Fitton et al. | GB | 1262131 | 2/1972 |
| 2011/0164959 | A1 | 7/2011 | Fitton et al. | GB | 1265341 | 3/1972 |
| 2011/0223014 | A1 | 9/2011 | Crawford et al. | GB | 1 278 606 | 6/1972 |
| 2011/0223015 | A1 | 9/2011 | Gammack et al. | GB | 1 304 560 | 1/1973 |
| 2012/0031509 | A1 | 2/2012 | Wallace et al. | GB | 1 403 188 | 8/1975 |
| 2012/0033952 | A1 | 2/2012 | Wallace et al. | GB | 1 434 226 | 5/1976 |
| 2012/0034108 | A1 | 2/2012 | Wallace et al. | GB | 1501473 | 2/1978 |
| 2012/0039705 | A1 | 2/2012 | Gammack | GB | 2 094 400 | 9/1982 |
| 2012/0045315 | A1 | 2/2012 | Gammack | GB | 2 107 787 | 5/1983 |
| 2012/0045316 | A1 | 2/2012 | Gammack | GB | 2 111 125 | 6/1983 |
| 2012/0057959 | A1 | 3/2012 | Hodgson et al. | GB | 2 178 256 | 2/1987 |
| 2012/0082561 | A1 | 4/2012 | Gammack et al. | GB | 2 185 533 | 7/1987 |
| 2012/0093629 | A1 | 4/2012 | Fitton et al. | GB | 2185531 | 7/1987 |
| 2012/0093630 | A1 | 4/2012 | Fitton et al. | GB | 2 218 196 | 11/1989 |
| 2012/0230658 | A1 | 9/2012 | Fitton et al. | GB | 2236804 | 4/1991 |
| | | | | GB | 2 240 268 | 7/1991 |

FOREIGN PATENT DOCUMENTS

| | | | | | |
|---|---|---|---|---|---|
| CA | 2155482 | 9/1996 | GB | 2242935 | 10/1991 |
| CH | 346643 | 5/1960 | GB | 2 285 504 | 7/1995 |
| CN | 2085866 | 10/1991 | GB | 2 289 087 | 11/1995 |
| CN | 2111392 | 7/1992 | GB | 2383277 | 6/2003 |
| CN | 1437300 | 8/2003 | GB | 2 428 569 | 2/2007 |
| CN | 2650005 | 10/2004 | GB | 2 452 593 | 3/2009 |
| CN | 2713643 | 7/2005 | GB | 2452490 | 3/2009 |
| CN | 1680727 | 10/2005 | GB | 2463698 | 3/2010 |
| CN | 2833197 | 11/2006 | GB | 2464736 | 4/2010 |
| CN | 201180678 | 1/2009 | GB | 2466058 | 6/2010 |
| CN | 201221477 | 4/2009 | GB | 2468369 | 8/2010 |
| CN | 201281416 | 7/2009 | GB | 2468312 | 9/2010 |
| CN | 201349269 | 11/2009 | GB | 2468313 | 9/2010 |
| CN | 101749288 | 6/2010 | GB | 2468315 | 9/2010 |
| CN | 201502549 | 6/2010 | GB | 2468319 | 9/2010 |
| CN | 201568337 | 9/2010 | GB | 2468320 | 9/2010 |
| CN | 101936310 | 1/2011 | GB | 2468323 | 9/2010 |
| CN | 101984299 | 3/2011 | GB | 2468328 | 9/2010 |
| CN | 101985948 | 3/2011 | GB | 2468331 | 9/2010 |
| CN | 201763705 | 3/2011 | GB | 2473037 | 3/2011 |
| CN | 201763706 | 3/2011 | GB | 2479760 | 10/2011 |
| CN | 201770513 | 3/2011 | GB | 2482547 | 2/2012 |
| CN | 201779080 | 3/2011 | JP | 31-13055 | 8/1956 |
| CN | 201802648 | 4/2011 | JP | 35-4369 | 3/1960 |
| CN | 102095236 | 6/2011 | JP | 39-7297 | 3/1964 |
| CN | 102367813 | 3/2012 | JP | 49-150403 | 12/1974 |
| DE | 1 291 090 | 3/1969 | JP | 51-7258 | 1/1976 |
| DE | 24 51 557 | 5/1976 | JP | 53-60100 | 5/1978 |
| DE | 27 48 724 | 5/1978 | JP | 56-167897 | 12/1981 |
| DE | 3644567 | 7/1988 | JP | 57-71000 | 5/1982 |
| DE | 19510397 | 9/1996 | JP | 57-157097 | 9/1982 |
| DE | 197 12 228 | 10/1998 | JP | 61-31830 | 2/1986 |
| DE | 100 00 400 | 3/2001 | JP | 61-116093 | 6/1986 |
| DE | 10041805 | 6/2002 | JP | 61-280787 | 12/1986 |
| DE | 10 2009 007 037 | 8/2010 | JP | 62-223494 | 10/1987 |
| EP | 0 044 494 | 1/1982 | JP | 63-179198 | 7/1988 |
| EP | 0186581 | 7/1986 | JP | 63-306340 | 12/1988 |
| EP | 1 094 224 | 4/2001 | JP | 64-21300 U | 2/1989 |
| EP | 1 138 954 | 10/2001 | JP | 64-83884 | 3/1989 |
| EP | 1 779 745 | 5/2007 | JP | 1-138399 | 5/1989 |
| EP | 1 939 456 | 7/2008 | JP | 1-224598 | 9/1989 |
| EP | 1 980 432 | 10/2008 | JP | 2-146294 | 6/1990 |
| EP | 2 000 675 | 12/2008 | JP | 2-218890 | 8/1990 |
| EP | 2191142 | 6/2010 | JP | 2-248690 | 10/1990 |
| FR | 1033034 | 7/1953 | JP | 3-52515 | 5/1991 |
| FR | 1119439 | 6/1956 | JP | 3-267598 | 11/1991 |
| FR | 1387334 | 1/1965 | JP | 4-43895 | 2/1992 |
| FR | 2 534 983 | 4/1984 | JP | 4-366330 | 12/1992 |
| FR | 2 640 857 | 6/1990 | JP | 5-157093 | 6/1993 |
| FR | 2 658 593 | 8/1991 | JP | 5-164089 | 6/1993 |
| FR | 2794195 | 12/2000 | JP | 5-263786 | 10/1993 |
| FR | 2 874 409 | 2/2006 | JP | 6-74190 | 3/1994 |
| FR | 2 906 980 | 4/2008 | JP | 6-86898 | 3/1994 |
| GB | 22235 | 6/1914 | JP | 6-147188 | 5/1994 |
| GB | 383498 | 11/1932 | JP | 6-257591 | 9/1994 |
| GB | 593828 | 10/1947 | JP | 6-280800 | 10/1994 |
| GB | 601222 | 4/1948 | JP | 6-336113 | 12/1994 |
| GB | 633273 | 12/1949 | JP | 7-190443 | 7/1995 |
| GB | 641622 | 8/1950 | JP | 8-21400 | 1/1996 |
| GB | 661747 | 11/1951 | JP | 9-100800 | 4/1997 |
| GB | 863 124 | 3/1961 | JP | 9-287600 | 11/1997 |
| GB | 1067956 | 5/1967 | JP | 11-227866 | 8/1999 |
| | | | JP | 2000-116179 | 4/2000 |

| | | |
|---|---|---|
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 3127331 | 11/2006 |
| JP | 2007-138763 | 6/2007 |
| JP | 2007-138789 | 6/2007 |
| JP | 2008-39316 | 2/2008 |
| JP | 2008-100204 | 5/2008 |
| JP | 3146538 | 10/2008 |
| JP | 2008-294243 | 12/2008 |
| JP | 2009-44568 | 2/2009 |
| JP | 2010-131259 | 6/2010 |
| KR | 10-2005-0102317 | 10/2005 |
| KR | 2007-0007997 | 1/2007 |
| KR | 10-2010-0055611 | 5/2010 |
| KR | 10-0985378 | 9/2010 |
| TW | M394383 | 12/2010 |
| TW | M407299 | 7/2011 |
| WO | WO 90/13478 | 11/1990 |
| WO | WO-02/073096 | 9/2002 |
| WO | WO 03/058795 | 7/2003 |
| WO | WO-03/069931 | 8/2003 |
| WO | WO-2005/050026 | 6/2005 |
| WO | WO 2005/057091 | 6/2005 |
| WO | WO-2006/008021 | 1/2006 |
| WO | WO-2006/012526 | 2/2006 |
| WO | WO 2007/024955 | 3/2007 |
| WO | WO 2007/048205 | 5/2007 |
| WO | WO 2008/014641 | 2/2008 |
| WO | WO-2008/024569 | 2/2008 |
| WO | WO-2009/030879 | 3/2009 |
| WO | WO-2009/030881 | 3/2009 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |

OTHER PUBLICATIONS

Gammack, P. et al., U.S. Office Action mailed Jun. 24, 2011, directed to U.S. Appl. No. 12/716,781; 19 pages.

Gammack et al., Office Action mailed Sep. 17, 2012, directed to U.S. Appl. No. 13/114,707; 12 pages.

Gammack et al., U.S. Office Action mailed Aug. 20, 2012, directed to U.S. Appl. No. 12/945,558; 15 pages.

Gammack, P. et al., U.S. Office Action mailed Apr. 12, 2011, directed to U.S. Appl. No. 12/716,749; 8 pages.

Gammack, P. et al., U.S. Office Action mailed Sep. 1, 2011, directed to U.S. Appl. No. 12/716,749; 9 pages.

Gammack, P. et al., U.S. Office Action mailed May 24, 2011, directed to U.S. Appl. No. 12/716,613; 9 pages.

Gammack, P. et al., U.S. Office Action mailed Sep. 7, 2011, directed to U.S. Appl. No. 12/230,613; 15 pages.

Nicolas, F. et al., U.S. Office Action mailed Sep. 8, 2011, directed to U.S. Appl. No. 12/622,844; 11 pages.

Fitton, et al., U.S. Office Action mailed Sep. 6, 2011, directed to U.S. Appl. No. 12/716,780; 16 pages.

GB Search Report dated Jun. 5, 2009, directed to counterpart GB Patent Application No. 0903693.0; 1 page.

Reba, I., (Jun. 1966),"Applications of the Coanda Effect," *Scientific American*.214:84-92.

Gammack et al., U.S. Appl. No. 12/917,247, filed Nov. 1, 2010; 40 pages.

Gammack et al., U.S. Appl. No. 12/945,558, filed Nov. 12, 2010; 23 pages.

Fitton et al., U.S. Office Action mailed Nov. 30, 2010 directed to U.S. Appl. No. 12/560,232; 9 pages.

Gammack, P. et al., U.S. Office Action mailed Dec. 9, 2010, directed to U.S. Appl. No. 12/203,698; 10 pages.

Gammack, P. et al., U.S. Office Action mailed Dec. 9, 2010, directed to U.S. Appl. No. 12/716,781; 17 pages.

Gammack, P. et al., U.S. Office Action mailed Dec. 10, 2010, directed to U.S. Appl. No. 12/230,613; 12 pages.

Simmonds, K. J. et al. U.S. Appl. No. 13/125,742, filed Apr. 22, 2011; 20 pages.

Nicolas, F. et al., U.S. Office Action mailed Mar. 7, 2011, directed to U.S. Appl. No. 12/622,844; 10 pages.

Fitton, N. G. et al., U.S. Office Action mailed Mar. 8, 2011, directed to U.S. Appl. No. 12/716,780; 12 pages.

Fitton et al., U.S. Office Action mailed Mar. 30, 2012, directed to U.S. Appl. No. 12/716,707; 7 pages.

Reba, I. (1966)."Applications of the Coanda Effect," *Scientific American* 214:84-92.

International Search Report and Written Opinion mailed May 18, 2010, directed to International Application No. PCT/GB2010/050274; 11 pages.

Gammack, P. et al., U.S. Office Action mailed Jun. 8, 2012, directed to U.S. Appl. No. 12/230,613; 15 pages.

Gammack, P. et al., U.S. Office Action mailed Jun. 25, 2012, directed to U.S. Appl. No. 12/716,749; 11 pages.

Gammack, P. et al. U.S. Office Action mailed May 13, 2011, directed to U.S. Appl. No. 12/230,613; 13 pages.

Third Party Submission Under 37 CFR 1.99 filed Jun. 2, 2011, directed towards U.S. Appl. No. 12/203,698; 3 pages.

* cited by examiner

FAN ASSEMBLY

REFERENCE TO RELATED APPLICATIONS

This application claims the priority of United Kingdom Application No. 0903693.0 filed 4 Mar. 2009, the entire contents of which are incorporated herein by reference.

FIELD OF THE INVENTION

The present invention relates to a fan assembly. In a preferred embodiment, the present invention relates to a domestic fan, such as a tower fan, for creating an air current in a room, office or other domestic environment.

BACKGROUND OF THE INVENTION

A conventional domestic fan typically includes a set of blades or vanes mounted for rotation about an axis, and drive apparatus for rotating the set of blades to generate an air flow. The movement and circulation of the air flow creates a 'wind chill' or breeze and, as a result, the user experiences a cooling effect as heat is dissipated through convection and evaporation.

Such fans are available in a variety of sizes and shapes. For example, a ceiling fan can be at least 1 m in diameter, and is usually mounted in a suspended manner from the ceiling to provide a downward flow of air to cool a room. On the other hand, desk fans are often around 30 cm in diameter, and are usually free standing and portable. Floor-standing tower fans generally comprise an elongate, vertically extending casing around 1 m high and housing one or more sets of rotary blades for generating an air flow, usually in the range from 300 to 500 l/s. An oscillating mechanism may be employed to rotate the outlet from the tower fan so that the air flow is swept over a wide area of a room.

A disadvantage of this type of arrangement is that the air flow produced by the rotating blades of the fan is generally not uniform. This is due to variations across the blade surface or across the outward facing surface of the fan. The extent of these variations can vary from product to product and even from one individual fan machine to another. These variations result in the generation of an uneven or 'choppy' air flow which can be felt as a series of pulses of air and which can be uncomfortable for a user.

In a domestic environment it is desirable for appliances to be as small and compact as possible due to space restrictions. It is undesirable for parts of the appliance to project outwardly, or for a user to be able to touch any moving parts, such as the blades. Many fans tend to have safety features such as a cage or shroud around the blades to prevent injury from the moving parts of the fan, but such caged parts can be difficult to clean.

SUMMARY OF THE INVENTION

The present invention provides a fan assembly for creating an air current, the fan assembly comprising an air inlet, an air outlet, an impeller and a motor for rotating the impeller to create an air flow passing from the air inlet to the air outlet, the air outlet comprising an interior passage for receiving the air flow and a mouth for emitting the air flow, the air outlet defining an opening through which air from outside the fan assembly is drawn by the air flow emitted from the mouth, wherein the motor has a rotor which, in use, is capable of rotating at a speed of at least 5,000 rpm.

With this fan assembly an air current can be generated and a cooling effect created without the use of a bladed fan. The air current created by the fan assembly has the benefit of being an air flow with low turbulence and with a more linear air flow profile than that provided by other prior art devices. This can improve the comfort of a user receiving the air flow. By providing a high speed motor to drive the impeller, the momentum of the air flow emitted through the mouth is not compromised by the channeling of the air flow into the interior passage, and the subsequent constriction of the air flow as it passes through the mouth.

Preferably, the rotor is capable of rotating at a speed of at least 8,000 rpm, more preferably at a speed of at least 9,000 rpm. The motor preferably comprises a DC brushless motor. This can avoid frictional losses and carbon debris from the brushes used in a traditional brushed motor. Reducing carbon debris and emissions is advantageous in a clean or pollutant sensitive environment such as a hospital or around those with allergies. While induction motors, which are generally used in bladed fans, also have no brushes, a DC brushless motor can provide a much wider range of operating speeds than an induction motor. The impeller is preferably a mixed flow impeller. The motor and the impeller are preferably located within a base of the fan assembly, the air outlet being preferably mounted on the base. The base preferably comprises the air inlet, which may be located in a side wall of the base. For example, the air inlet of the base may comprise a grille comprising an array of apertures. The base preferably has an air outlet which is arranged to convey the air flow in a substantially vertical direction into the interior passage of the air outlet. The base is preferably cylindrical in shape, and preferably has a height in the range from 100 to 300 mm. The fan assembly preferably has a height in the range from 400 to 1500 mm.

In the following description of fan assemblies, and, in particular a fan of the preferred embodiment, the term 'bladeless' is used to describe a fan assembly in which air flow is emitted or projected forward from the fan assembly without the use of moving blades. By this definition a bladeless fan assembly can be considered to have an output area or emission zone absent moving blades from which the air flow is directed towards a user or into a room. The output area of the bladeless fan assembly may be supplied with a primary air flow generated by one of a variety of different sources, such as pumps, generators, motors or other fluid transfer devices, and which may include a rotating device such as a motor rotor and/or a bladed impeller for generating the air flow. The generated primary air flow can pass from the room space or other environment outside the fan assembly through the interior passage to the mouth, and then back out to the room space through the mouth of the air outlet.

Hence, the description of a fan assembly as bladeless is not intended to extend to the description of the power source and components such as motors that are required for secondary fan functions. Examples of secondary fan functions can include lighting, adjustment and oscillation of the fan assembly.

The direction in which air is emitted from the mouth is preferably substantially at a right angle to the direction in which the air flow passes through at least part of the interior passage. In the preferred embodiment, the air flow passes through at least part of the interior passage in a substantially vertical direction, and the air is emitted from the mouth in a substantially horizontal direction. The interior passage is preferably located towards the front of the air outlet, whereas the mouth is preferably located towards the rear of the air outlet and arranged to direct air towards the front of the air outlet and through the opening. Consequently, in the preferred embodiment the mouth is shaped so as substantially to reverse the flow direction of each portion of the air flow as it passes from the interior passage to an outlet of the mouth. The mouth is preferably substantially U-shaped in cross-section, and preferably narrows towards the outlet thereof.

The shape of the air outlet is not constrained by the requirement to include space for a bladed fan. Preferably, the air outlet comprises a nozzle, which preferably surrounds the opening. For example, the nozzle may extend about the opening by a distance in the range from 50 to 250 cm. In a preferred embodiment the air outlet is an elongate, annular nozzle which preferably has a height in the range from 500 to 1000 mm, and a width in the range from 100 to 300 mm. Alternatively, the air outlet may be substantially circular. The air outlet is preferably shaped to receive the air flow at one end thereof and to divide the air flow into two air streams, preferably with each air stream flowing along a respective elongate side of the opening.

The air outlet preferably comprises a casing, comprising an annular inner casing section and an annular outer casing section which define the interior passage, the mouth and the opening. Each casing section may comprise a plurality of components, but in the preferred embodiment each of these sections is formed from a single annular component. The outer casing section is preferably shaped so as to partially overlap the inner casing section to define at least one outlet of the mouth between overlapping portions of the external surface of the inner casing section and the internal surface of the outer casing section. The, or each, outlet is preferably in the form of a slot, preferably having a width in the range from 0.5 to 5 mm. Thus, the mouth preferably comprises a slot through which the air flow is emitted from the fan assembly. In the preferred embodiment, the mouth comprises a plurality of such outlets spaced about the opening. For example, one or more sealing members may be located within the mouth to define a plurality of spaced apart outlets. Preferably, the outlets are of substantially the same size. In the preferred embodiment in which the air outlet is in the form of an annular, elongate nozzle, each outlet is preferably located along a respective elongate side of the inner periphery of the nozzle.

The air outlet may comprise a plurality of spacers for urging apart the overlapping portions of the inner casing section and the outer casing section. This can enable a substantially uniform outlet width to be achieved about the opening. The uniformity of the outlet width results in a relatively smooth, substantially even output of air from the mouth.

The air outlet may comprise a surface, preferably a Coanda surface, located adjacent the mouth and over which the mouth is arranged to direct the air flow emitted therefrom. In the preferred embodiment, the external surface of the inner casing section is shaped to define the Coanda surface. A Coanda surface is a known type of surface over which fluid flow exiting an output orifice close to the surface exhibits the Coanda effect. The fluid tends to flow over the surface closely, almost 'clinging to' or 'hugging' the surface. The Coanda effect is already a proven, well documented method of entrainment in which a primary air flow is directed over a Coanda surface. A description of the features of a Coanda surface, and the effect of fluid flow over a Coanda surface, can be found in articles such as Reba, Scientific American, Volume 214, June 1966 pages 84 to 92. Through use of a Coanda surface, an increased amount of air from outside the fan assembly is drawn through the opening by the air emitted from the mouth.

In the preferred embodiment an air flow is created through the fan assembly. In the following description this air flow will be referred to as primary air flow. The primary air flow is emitted from the mouth and preferably passes over a Coanda surface. The primary air flow entrains air surrounding the mouth of the nozzle, which acts as an air amplifier to supply both the primary air flow and the entrained air to the user. The entrained air will be referred to here as a secondary air flow. The secondary air flow is drawn from the room space, region or external environment surrounding the mouth and, by displacement, from other regions around the fan assembly, and passes predominantly through the opening. The primary air flow directed over the Coanda surface combined with the entrained secondary air flow equates to a total air flow emitted or projected forward from the opening. The total air flow is sufficient for the fan assembly to create an air current suitable for cooling. Preferably, the entrainment of air surrounding the mouth is such that the primary air flow is amplified by at least five times, more preferably by at least ten times, while a smooth overall output is maintained. Preferably, the air outlet comprises a diffuser located downstream of the Coanda surface. The diffuser directs the air flow emitted towards a user's location while maintaining a smooth, even output, generating a suitable cooling effect without the user feeling a 'choppy' flow.

Where the air outlet is in the form of an elongate nozzle, the nozzle may comprise a plurality of stationary guide vanes located within the interior passage and each for directing a portion of the air flow towards the mouth. The use of such guide vanes can assist in producing a substantially uniform distribution of the air flow through the mouth.

The air inlet of the base may comprise a grille comprising an array of apertures. The air outlet of the base is preferably arranged to convey the air flow in a substantially vertical direction into the nozzle. The base is preferably cylindrical in shape, and preferably has a height in the range from 100 to 300 mm. The fan assembly preferably has a height in the range from 400 to 1500 mm.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
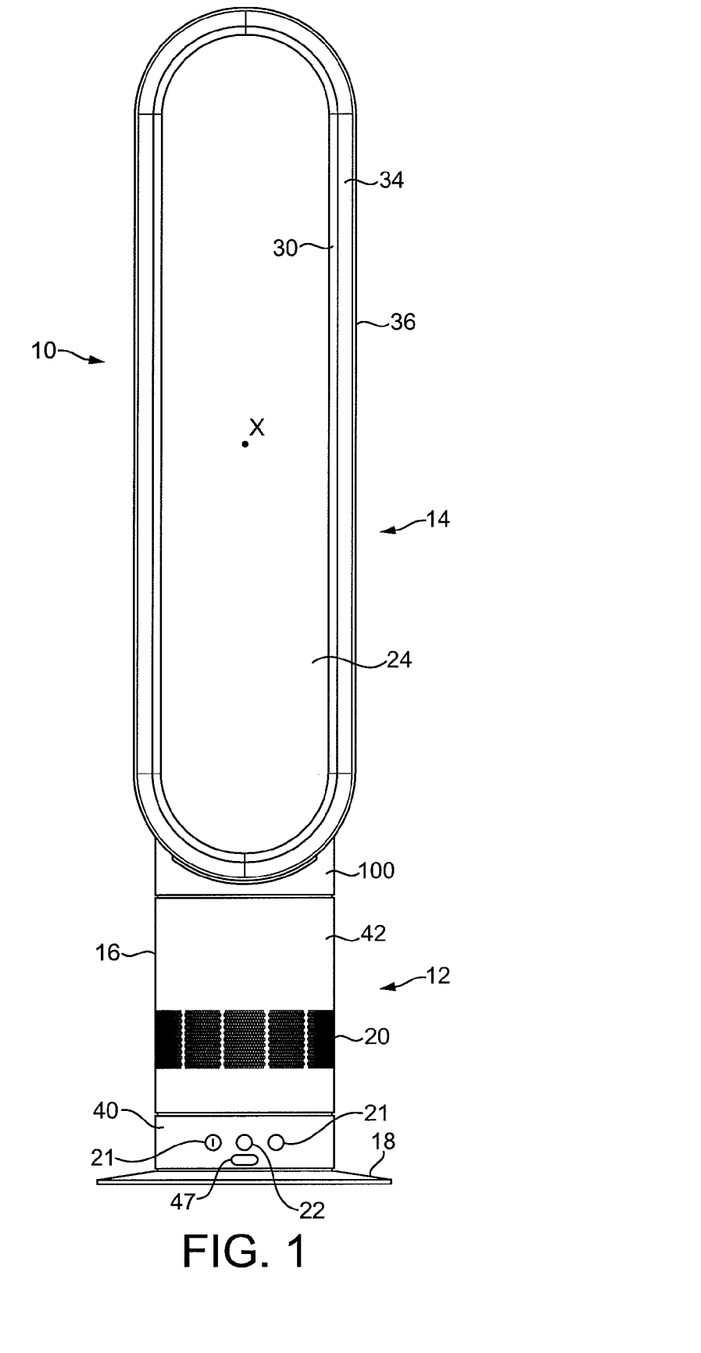
FIG. 1 is a front view of a tower fan.
Figure 2:
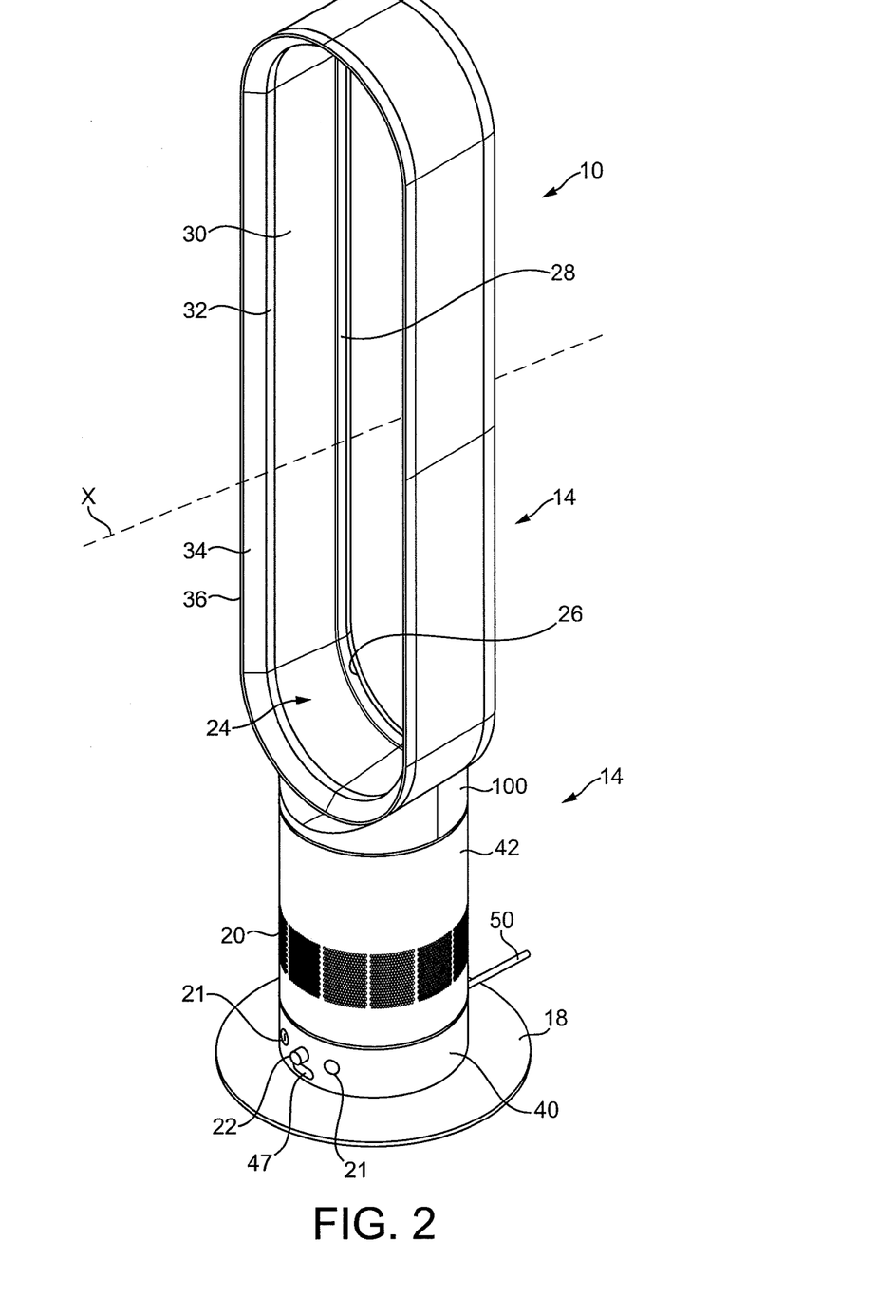
FIG. 2 is a perspective view of the fan of FIG. 1.

FIGS. 1 and 2 illustrate an embodiment of a bladeless fan assembly. In this embodiment, the bladeless fan assembly is in the form of a domestic, portable tower fan 10 comprising a base 12 and an air outlet in the form of a nozzle 14 mounted on and supported by the base 12. The base 12 comprises a substantially cylindrical outer casing 16 mounted optionally on a disc-shaped base plate 18. The outer casing 16 comprises a plurality of air inlets 20 in the form of apertures formed in the outer casing 16 and through which a primary air flow is drawn into the base 12 from the external environment. The base 12 further comprises a plurality of user-operable buttons 21 and a user-operable dial 22 for controlling the operation of the fan 10. In this embodiment the base 12 has a height in the range from 100 to 300 mm, and the outer casing 16 has a diameter in the range from 100 to 200 mm.

The nozzle 14 has an elongate, annular shape and defines a central elongate opening 24. The nozzle 14 has a height in the range from 500 to 1200 mm, and a width in the range from 150 to 400 mm. In this example, the height of the nozzle is around 750 mm and the width of the nozzle is around 190 mm. The nozzle 14 comprises a mouth 26 located towards the rear of the fan 10 for emitting air from the fan 10 and through the opening 24. The mouth 26 extends at least partially about the opening 24. The inner periphery of the nozzle 14 comprises a Coanda surface 28 located adjacent the mouth 26 and over which the mouth 26 directs the air emitted from the fan 10, a diffuser surface 30 located downstream of the Coanda surface 28 and a guide surface 32 located downstream of the diffuser surface 30. The diffuser surface 30 is arranged to taper away from the central axis X of the opening 24 in such a way so as to assist the flow of air emitted from the fan 10. The angle subtended between the diffuser surface 30 and the central axis X of the opening 24 is in the range from 5 to 15°, and in this embodiment is around 7°. The guide surface 32 is arranged at an angle to the diffuser surface 30 to further assist the efficient delivery of a cooling air flow from the fan 10. In the illustrated embodiment the guide surface 32 is arranged substantially parallel to the central axis X of the opening 24 to present a substantially flat and substantially smooth face to the air flow emitted from the mouth 26. A visually appealing tapered surface 34 is located downstream from the guide surface 32, terminating at a tip surface 36 lying substantially perpendicular to the central axis X of the opening 24. The angle subtended between the tapered surface 34 and the central axis X of the opening 24 is preferably around 45°. The overall depth of the nozzle 24 in a direction extending along the central axis X of the opening 24 is in the range from 100 to 150 mm, and in this example is around 110 mm.

Figure 3:
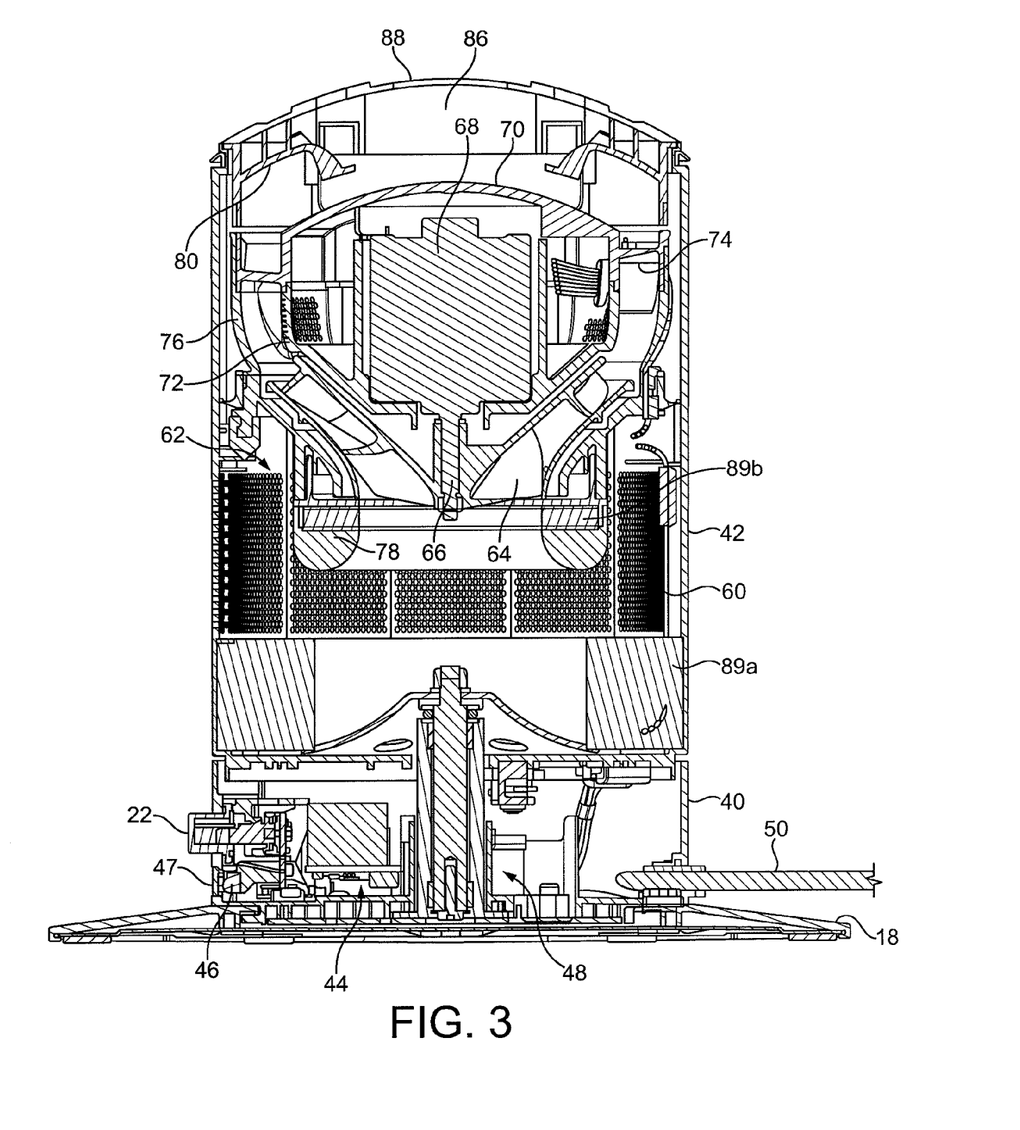
FIG. 3 is a cross-sectional view of the base of the fan of FIG. 1.

FIG. 3 illustrates a sectional view through the base 12 of the fan 10. The outer casing 16 of the base 12 comprises a lower casing section 40 and a main casing section 42 mounted on the lower casing section 40. The lower casing section 40 houses a controller, indicated generally at 44, for controlling the operation of the fan 10 in response to depression of the user operable buttons 21 shown in FIGS. 1 and 2, and/or manipulation of the user operable dial 22. The lower casing section 40 may optionally comprise a sensor 46 for receiving control signals from a remote control (not shown), and for conveying these control signals to the controller 44. These control signals are preferably infrared signals. The sensor 46 is located behind a window 47 through which the control signals enter the lower casing section 40 of the outer casing 16 of the base 12. A light emitting diode (not shown) may be provided for indicating whether the fan 10 is in a stand-by mode. The lower casing section 40 also houses a mechanism, indicated generally at 48, for oscillating the main casing section 42 relative to the lower casing section 40. The range of each oscillation cycle of the main casing section 42 relative to the lower casing section 40 is preferably between 60° and 120°, and in this embodiment is around 90°. In this embodiment, the oscillating mechanism 48 is arranged to perform around 3 to 5 oscillation cycles per minute. A mains power cable 50 extends through an aperture formed in the lower casing section 40 for supplying electrical power to the fan 10.

The main casing section 42 comprises a cylindrical grille 60 in which an array of apertures 62 is formed to provide the air inlets 20 of the outer casing 16 of the base 12. The main casing section 42 houses an impeller 64 for drawing the primary air flow through the apertures 62 and into the base 12. Preferably, the impeller 64 is in the form of a mixed flow impeller. The impeller 64 is connected to a rotary shaft 66 extending outwardly from a motor 68. In this embodiment, the motor 68 is a DC brushless motor having a speed which is variable by the controller 44 in response to user manipulation of the dial 22 and/or a signal received from the remote control. The maximum speed of the motor 68 is preferably in the range from 5,000 to 10,000 rpm. The motor 68 is housed within a motor bucket comprising an upper portion 70 connected to a lower portion 72. The upper portion 70 of the motor bucket comprises a diffuser 74 in the form of a stationary disc having spiral blades. The motor bucket is located within, and mounted on, a generally frustro-conical impeller housing 76 connected to the main casing section 42. The impeller 42 and the impeller housing 76 are shaped so that the impeller 42 is in close proximity to, but does not contact, the inner surface of the impeller housing 76. A substantially annular inlet member 78 is connected to the bottom of the impeller housing 76 for guiding the primary air flow into the impeller housing 76. The impeller housing 76 is oriented so that the primary air flow is exhausted from the impeller housing 76 in a substantially vertical direction.

A profiled upper casing section 80 is connected to the open upper end of the main casing section 42 of the base 12, for example by means of snap-fit connections 82. An O-ring sealing member 84 is used to form an air-tight seal between the main casing section 42 and the upper casing section 80 of the base 12. The upper casing section 80 comprises a chamber 86 for receiving the primary air flow from the main casing section 42, and an aperture 88 through which the primary air flow passes from the base 12 into the nozzle 14.

Preferably, the base 12 further comprises silencing foam for reducing noise emissions from the base 12. In this embodiment, the main casing section 42 of the base 12 comprises a first, generally cylindrical foam member 89a located beneath the grille 60, a second, substantially annular foam member 89b located between the impeller housing 76 and the inlet member 78, and a third, substantially annular foam member 89c located within the motor bucket.

The nozzle 14 of the fan 10 will now be described with reference to FIGS. 4 to 13. The nozzle 14 comprises a casing comprising an elongate, annular outer casing section 90 connected to and extending about an elongate, annular inner casing section 92. The inner casing section 92 defines the central opening 24 of the nozzle 14, and has an external peripheral surface 93 which is shaped to define the Coanda surface 28, diffuser surface 30, guide surface 32 and tapered surface 34.

Figure 4:
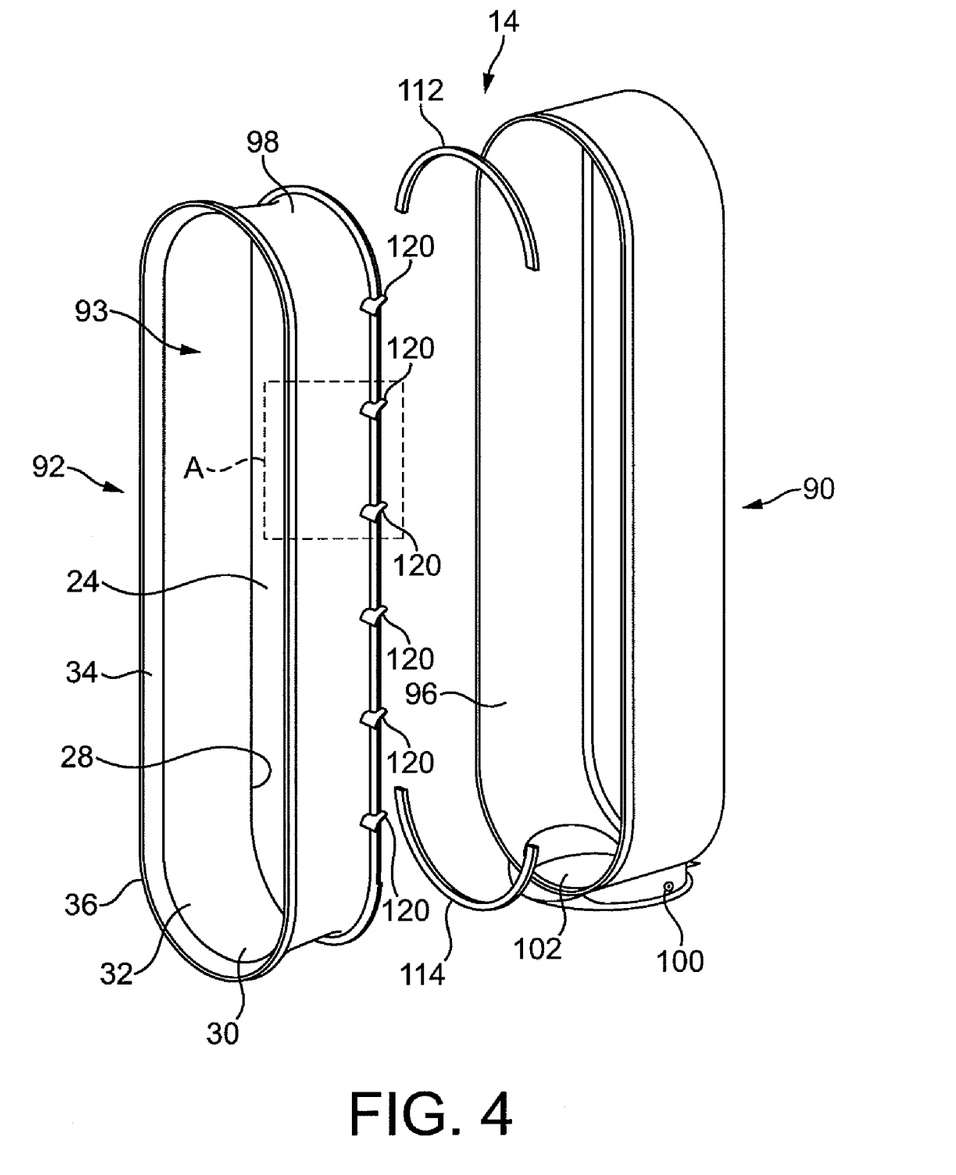
FIG. 4 is an exploded view of the nozzle of the fan of FIG. 1.
Figure 5:
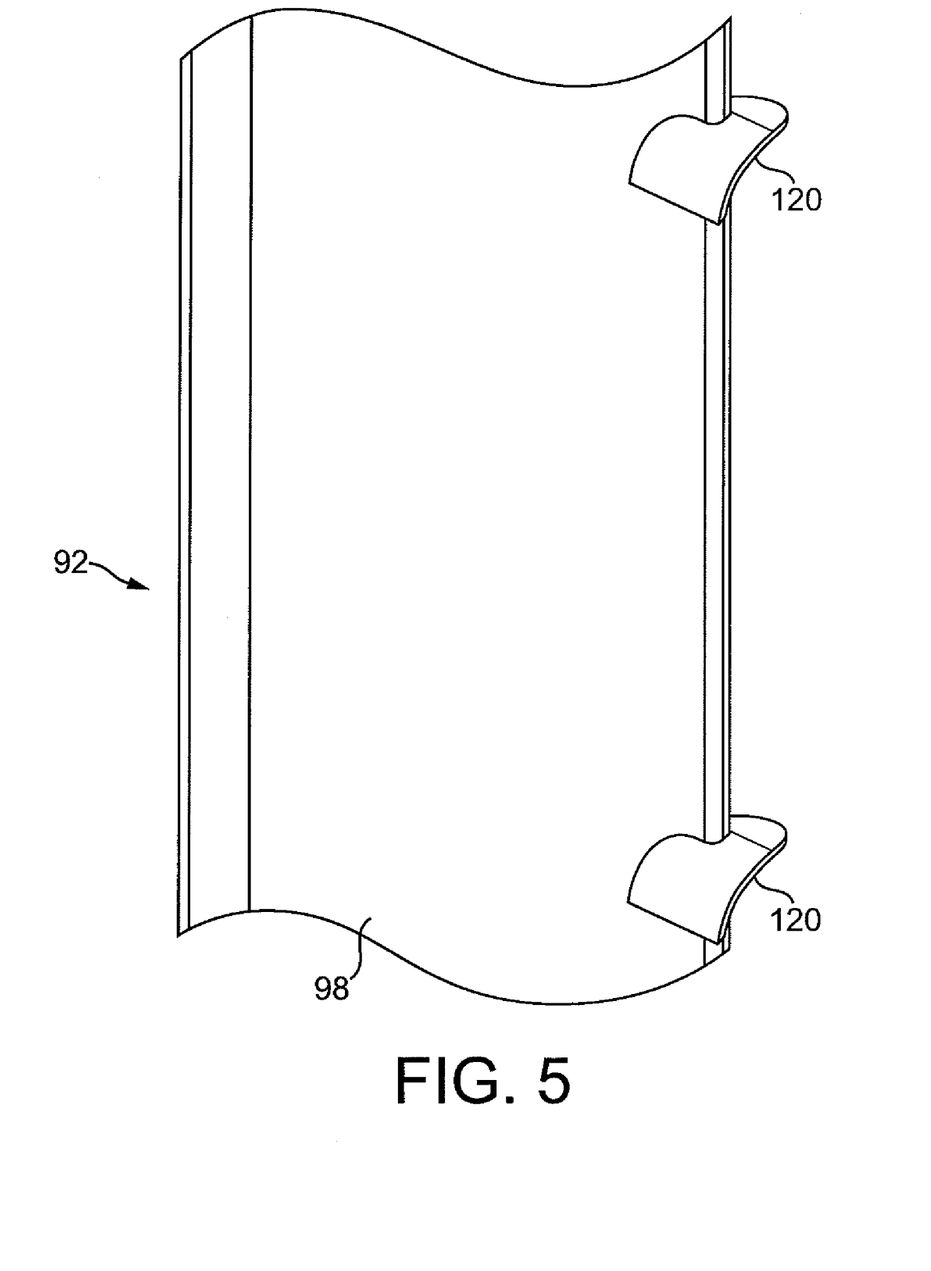
FIG. 5 is an enlarged view of area A indicated in FIG. 4.
Figure 6:
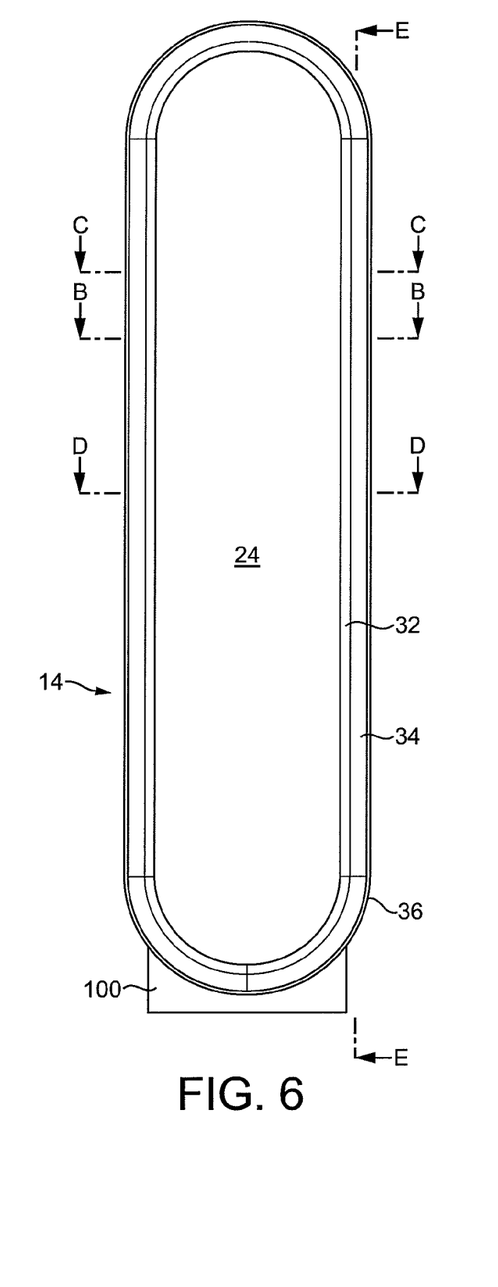
FIG. 6 is a front view of the nozzle of FIG. 4.

The outer casing section 90 and the inner casing section 92 together define an annular interior passage 94 of the nozzle 14. The interior passage 94 is located towards the front of the fan 10. The interior passage 94 extends about the opening 24, and thus comprises two substantially vertically extending sections each adjacent a respective elongate side of the central opening 24, an upper curved section joining the upper ends of the vertically extending sections, and a lower curved section joining the lower ends of the vertically extending sections. The interior passage 94 is bounded by the internal peripheral surface 96 of the outer casing section 90 and the internal peripheral surface 98 of the inner casing section 92. The outer casing section 90 comprises a base 100 which is connected to, and over, the upper casing section 80 of the base 12, for example by a snap-fit connection. The base 100 of the outer casing section 90 comprises an aperture 102 which is aligned with the aperture 88 of the upper casing section 80 of the base 12 and through which the primary air flow enters the lower curved portion of the interior passage 94 of the nozzle 14 from the base 12 of the fan 10.

Figure 8:
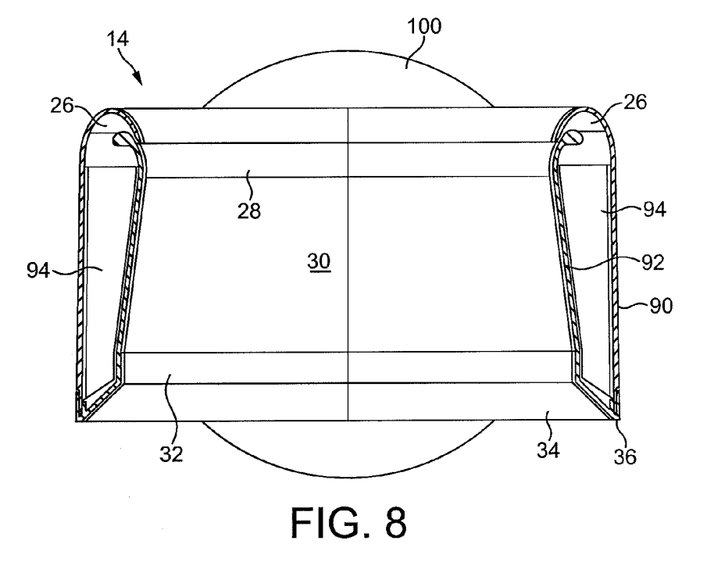
FIG. 8 is a sectional view of the nozzle taken along line D-D in FIG. 6.
Figure 9:
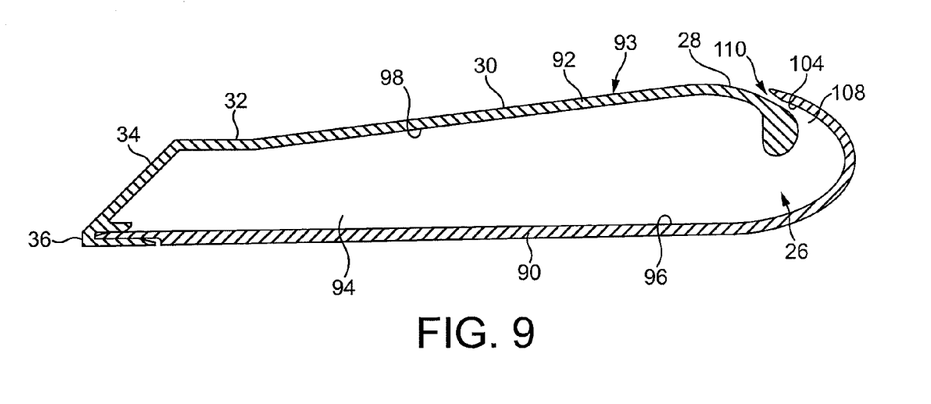
FIG. 9 is an enlarged view of a section of the nozzle illustrated in FIG. 8.
Figure 10:
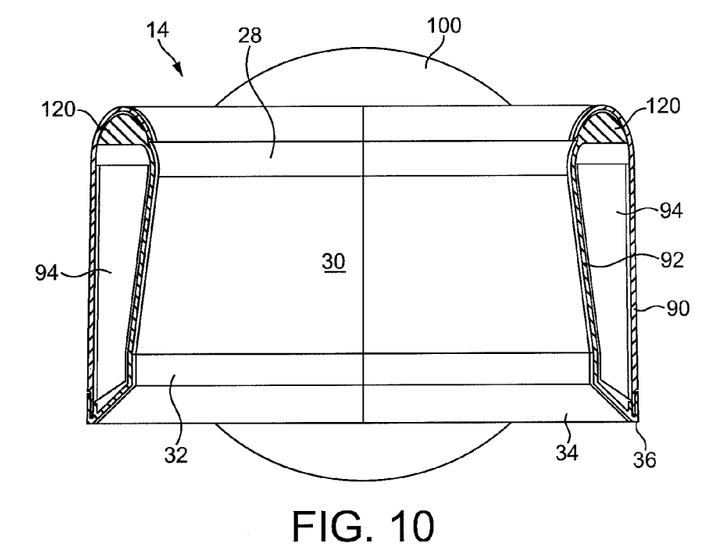
FIG. 10 is a sectional view of the nozzle taken along line C-C in FIG. 6.

With particular reference to FIGS. 8 and 9, the mouth 26 of the nozzle 14 is located towards the rear of the fan 10. The mouth 26 is defined by overlapping, or facing, portions 104, 106 of the internal peripheral surface 96 of the outer casing section 90 and the external peripheral surface 93 of the inner casing section 92, respectively. In this embodiment, the mouth 26 comprises two sections each extending along a respective elongate side of the central opening 24 of the nozzle 14, and in fluid communication with a respective vertically extending section of the interior passage 94 of the nozzle 14. The air flow through each section of the mouth 26 is substantially orthogonal to the air flow through the respective vertically extending portion of the interior passage 94 of the nozzle 14. Each section of the mouth 26 is substantially U-shaped in cross-section, and so as a result the direction of the air flow is substantially reversed as the air flow passes through the mouth 26. In this embodiment, the overlapping portions 104, 106 of the internal peripheral surface 96 of the outer casing section 90 and the external peripheral surface 93 of the inner casing section 92 are shaped so that each section of the mouth 26 comprises a tapering portion 108 narrowing to an outlet 110. Each outlet 110 is in the form of a substantially vertically extending slot, preferably having a relatively constant width in the range from 0.5 to 5 mm. In this embodiment each outlet 110 has a width of around 1.1 mm.

The mouth 26 may thus be considered to comprise two outlets 110 each located on a respective side of the central opening 24. Returning to FIG. 4, the nozzle 14 further comprises two curved seal members 112, 114 each for forming a seal between the outer casing section 90 and the inner casing section 92 so that there is substantially no leakage of air from the curved sections of the interior passage 94 of the nozzle 14.

In order to direct the primary air flow into the mouth 26, the nozzle 14 comprises a plurality of stationary guide vanes 120 located within the interior passage 94 and each for directing a portion of the air flow towards the mouth 26. The guide vanes 120 are illustrated in FIGS. 4, 5, 7, 10 and 11. The guide vanes 120 are preferably integral with the internal peripheral surface 98 of the inner casing section 92 of the nozzle 14. The guide vanes 120 are curved so that there is no significant loss in the velocity of the air flow as it is directed into the mouth 26. In this embodiment the nozzle 14 comprises two sets of guide vanes 120, with each set of guide vanes 120 directing air passing along a respective vertically extending portion of the interior passage 94 towards its associated section of the mouth 26. Within each set, the guide vanes 120 are substantially vertically aligned and evenly spaced apart to define a plurality of passageways 122 between the guide vanes 120 and through which air is directed into the mouth 26. The even spacing of the guide vanes 120 provides a substantially even distribution of the air stream along the length of the section of the mouth 26.

Figure 7:
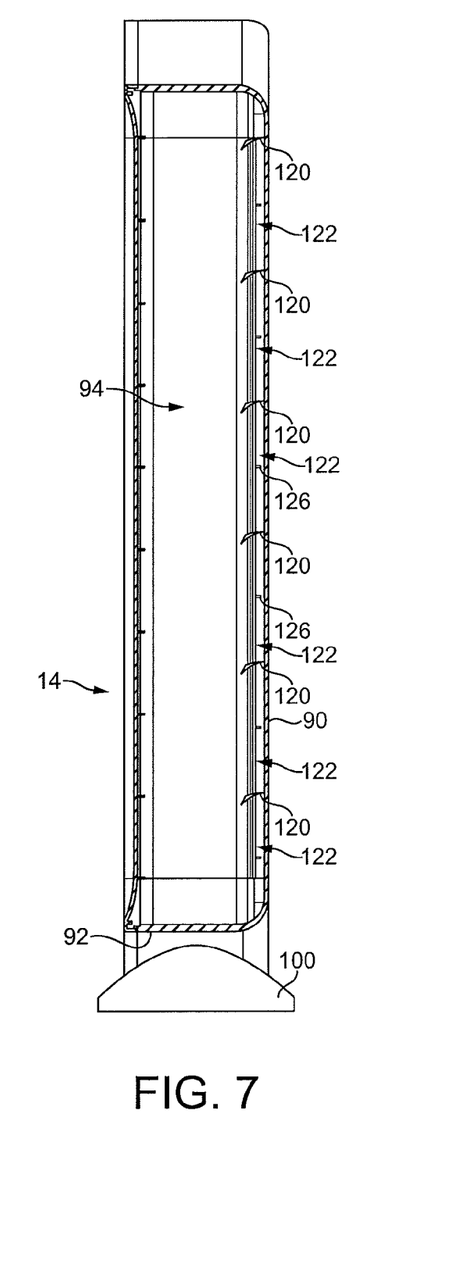
FIG. 7 is a sectional view of the nozzle taken along line E-E in FIG. 6.
Figure 11:
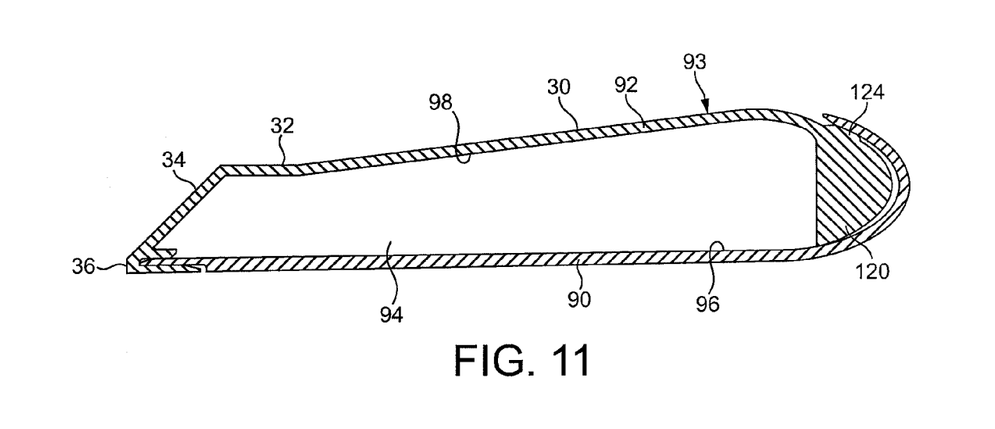
FIG. 11 is an enlarged view of a section of the nozzle illustrated in FIG. 10.
Figure 12:
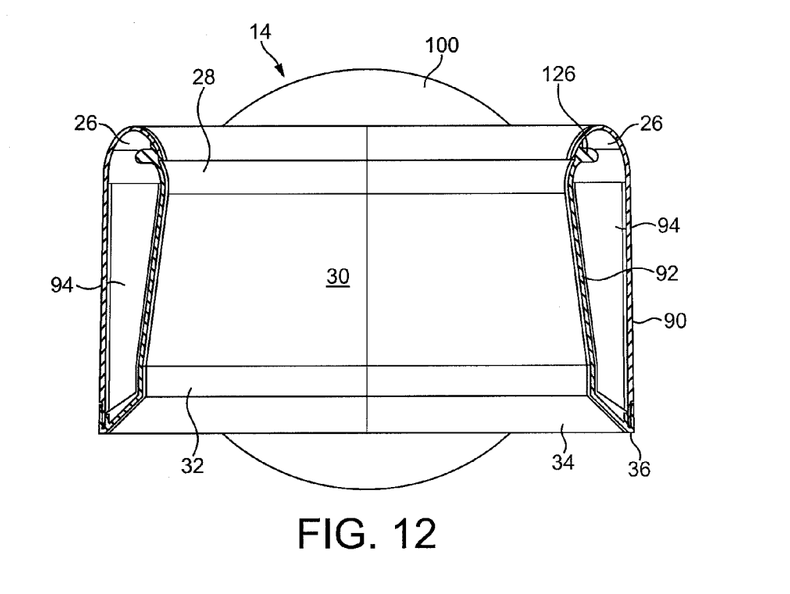
FIG. 12 is a sectional view of the nozzle taken along line B-B in FIG. 6.
Figure 13:
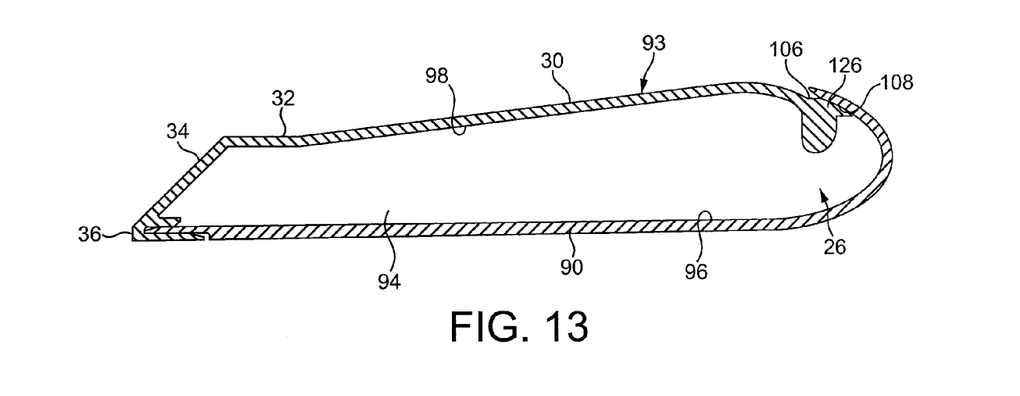
FIG. 13 is an enlarged view of a section of the nozzle illustrated in FIG. 12.

With reference to FIG. 11, the guide vanes 120 are preferably shaped so that a portion 124 of each guide vane 120 engages the internal peripheral surface 96 of the outer casing section 90 of the nozzle 24 so as to urge apart the overlapping portions 104, 106 of the internal peripheral surface 96 of the outer casing section 90 and the external peripheral surface 93 of the inner casing section 92. This can assist in maintaining the width of each outlet 110 at a substantially constant level along the length of each section of the mouth 26. With reference to FIGS. 7, 12 and 13, in this embodiment additional spacers 126 are provided along the length of each section of the mouth 26, also for urging apart the overlapping portions 104, 106 of the internal peripheral surface 96 of the outer casing section 90 and the external peripheral surface 93 of the inner casing section 92, to maintain the width of the outlet 110 at the desired level. Each spacer 126 is located substantially midway between two adjacent guide vanes 120. To facilitate manufacture the spacers 126 are preferably integral with the external peripheral surface 98 of the inner casing section 92 of the nozzle 14. Additional spacers 126 may be provided between adjacent guide vanes 120 if so desired.

In use, when the user depresses an appropriate one of the buttons 21 on the base 12 of the fan 10 the controller 44 activates the motor 68 to rotate the impeller 64, which causes a primary air flow to be drawn into the base 12 of the fan 10 through the air inlets 20. The primary air flow may be up to 30 litres per second, more preferably up to 50 litres per second. The primary air flow passes through the impeller housing 76 and the upper casing section 80 of the base 12, and enters the base 100 of the outer casing section 90 of the nozzle 14, from which the primary air flow enters the interior passage 94 of the nozzle 14.

Figure 14:
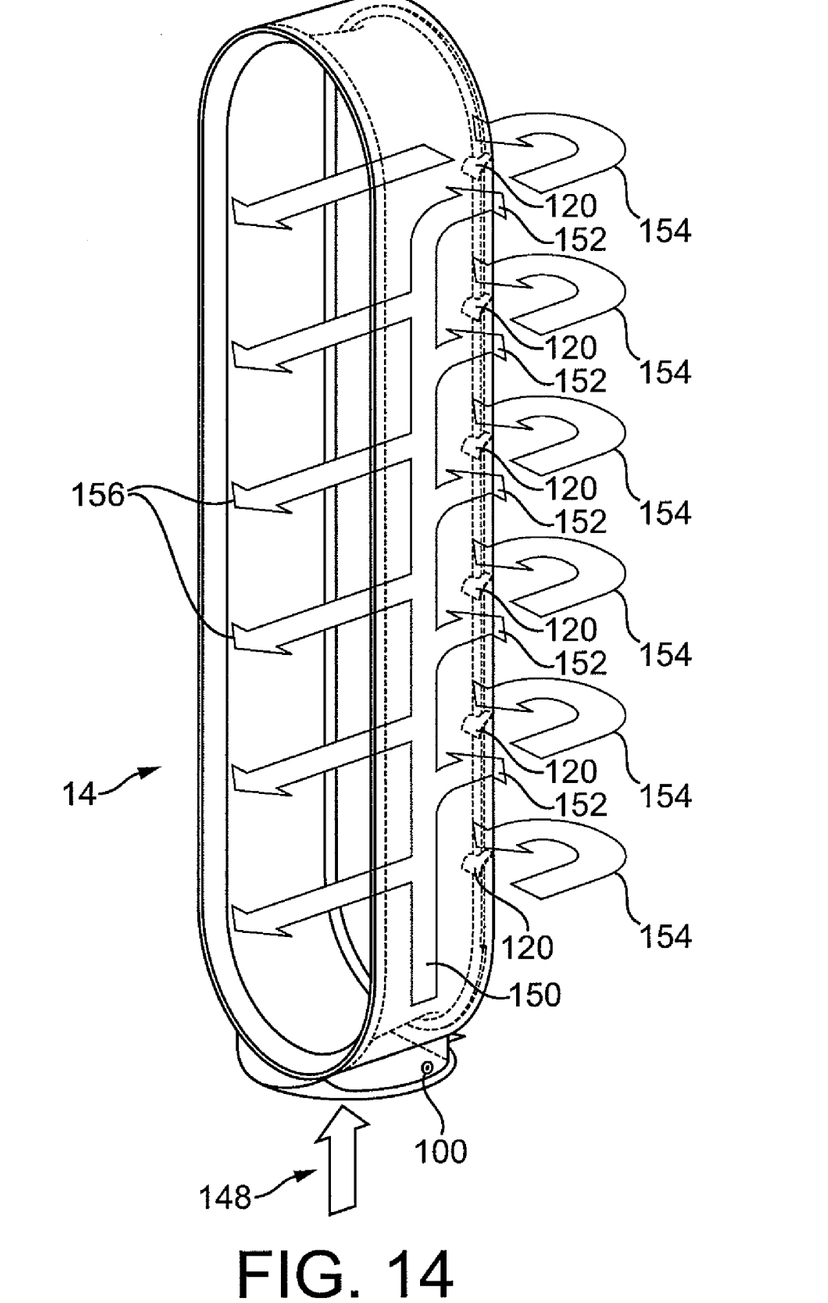
FIG. 14 illustrates the air flow through part of the nozzle of the fan of FIG. 1.

With reference also to FIG. 14 the primary air flow, indicated at 148, is divided into two air streams, one of which is indicated at 150 in FIG. 14, which pass in opposite directions around the central opening 24 of the nozzle 14. Each air stream 150 enters a respective one of the two vertically extending sections of the interior passage 94 of the nozzle 14, and is conveyed in a substantially vertical direction up through each of these sections of the interior passage 94. The set of guide vanes 120 located within each of these sections of the interior passage 94 directs the air stream 150 towards the section of the mouth 26 located adjacent that vertically extending section of the interior passage 94. Each of the guide vanes 120 directs a respective portion 152 of the air stream 150 towards the section of the mouth 26 so that there is a substantially uniform distribution of the air stream 150 along the length of the section of the mouth 26. The guide vanes 120 are shaped so that each portion 152 of the air stream 150 enters the mouth 26 in a substantially horizontal direction. Within each section of the mouth 26, the flow direction of the portion of the air stream is substantially reversed, as indicated at 154 in FIG. 14. The portion of the air stream is constricted as the section of the mouth 26 tapers towards the outlet 110 thereof, channeled around the spacer 126 and emitted through the outlet 110, again in a substantially horizontal direction.

The primary air flow emitted from the mouth 26 is directed over the Coanda surface 28 of the nozzle 14, causing a secondary air flow to be generated by the entrainment of air from the external environment, specifically from the region around the outlets 110 of the mouth 26 and from around the rear of the nozzle 14. This secondary air flow passes predominantly through the central opening 24 of the nozzle 14, where it combines with the primary air flow to produce a total air flow 156, or air current, projected forward from the nozzle 14.

The even distribution of the primary air flow along the mouth 26 of the nozzle 14 ensures that the air flow passes evenly over the diffuser surface 30. The diffuser surface 30 causes the mean speed of the air flow to be reduced by moving the air flow through a region of controlled expansion. The relatively shallow angle of the diffuser surface 30 to the central axis X of the opening 24 allows the expansion of the air flow to occur gradually. A harsh or rapid divergence would otherwise cause the air flow to become disrupted, generating vortices in the expansion region. Such vortices can lead to an increase in turbulence and associated noise in the air flow, which can be undesirable, particularly in a domestic product such as a fan. In the absence of the guide vanes 120 most of the primary air flow would tend to leave the fan 10 through the upper part of the mouth 26, and to leave the mouth 26 upwardly at an acute angle to the central axis of the opening 24. As a result there would be an uneven distribution of air within the air current generated by the fan 10. Furthermore, most of the air flow from the fan 10 would not be properly diffused by the diffuser surface 30, leading to the generation of an air current with much greater turbulence.

The air flow projected forwards beyond the diffuser surface 30 can tend to continue to diverge. The presence of the guide surface 32 extending substantially parallel to the central axis X of the opening 30 tends to focus the air flow towards the user or into a room.

Depending on the speed of the motor 64, the mass flow rate of the air current projected forward from the fan 10 may be up to 500 litres per second, and in the preferred embodiment is up to 700 litres per second, and the maximum speed of the air current may be in the range from 3 to 4 m/s.

The invention is not limited to the detailed description given above. Variations will be apparent to the person skilled in the art.

For example, the base and the nozzle of the fan may be of a different shape and/or shape. The outlet of the mouth may be modified. For example, the outlet of the mouth may be widened or narrowed to a variety of spacings to maximise air flow. The air flow emitted from the mouth may pass over a surface, such as Coanda surface, but alternatively the air flow may be emitted through the mouth and projected forward from the fan without passing over an adjacent surface. The Coanda effect may be effected over a number of different surfaces, or a number of internal or external designs may be used in combination to achieve the flow and entrainment required. The diffuser surface may be comprised of a variety of diffuser lengths and structures. The guide surface may be a variety of lengths, and may be arranged at a number of different positions and orientations as required for different fan requirements and different types of fan performance. Additional features such as lighting or a clock or LCD display may be provided within the central opening defined by the nozzle.

The invention claimed is:

1. A fan assembly for creating an air current, the fan assembly comprising an air inlet, an air outlet, an impeller and a motor for rotating the impeller to create an air flow passing from the air inlet to the air outlet, the air outlet comprising an interior passage for receiving the air flow and a mouth for emitting the air flow, the air outlet defining an opening through which air from outside the fan assembly is drawn by the air flow emitted from the mouth, wherein the motor has a rotor which, in use, is capable of rotating at a speed of at least 5,000 rpm, the fan assembly comprising a base housing the impeller and the motor, the air inlet being located in a side wall of the base.

2. The fan assembly of claim 1, wherein the rotor is capable of rotating at a speed of at least 8,000 rpm.

3. The fan assembly of claim 1, wherein the rotor is capable of rotating at a speed of at least 9,000 rpm.

4. The fan assembly of claim 1, wherein the interior passage is shaped to divide the air flow into two air streams and to direct each air stream along a respective side of the opening.

5. The fan assembly of claim 1, wherein the air outlet comprises an annular inner casing section and an annular outer casing section which together define the interior passage and the mouth.

6. The fan assembly of claim 5, wherein the mouth comprises an outlet located between an external surface of the inner casing section and an internal surface of the outer casing section.

7. The fan assembly of claim 6, wherein the outlet is in the form of a slot.

8. The fan assembly of claim 6, wherein the outlet has a width in the range from 0.5 to 5 mm.

9. The fan assembly of claim 1, wherein the air outlet comprises a surface located adjacent the mouth and over which the mouth is arranged to direct the air flow.

10. The fan assembly of claim 9, wherein the surface is a Coanda surface.

11. The fan assembly of claim 10, wherein the air outlet comprises a diffuser located downstream of the Coanda surface.

12. The fan assembly of claim 1, wherein the motor is a DC brushless motor.

13. The fan assembly of claim 1, wherein the fan assembly has a height in the range from 400 to 1500 mm.

14. A fan assembly for creating an air current, the fan assembly comprising an air inlet, an air outlet, an impeller and a motor for rotating the impeller to create an air flow passing from the air inlet to the air outlet, the air outlet comprising an interior passage for receiving the air flow and a mouth for emitting the air flow, the air outlet defining an opening through which air from outside the fan assembly is drawn by the air flow emitted from the mouth, wherein the motor has a rotor which, in use, is capable of rotating at a speed of at least 5,000 rpm, wherein the air outlet comprises a Coanda surface located adjacent the mouth and over which the mouth is arranged to direct the air flow, and a diffuser located downstream of the Coanda surface.

15. The fan assembly of claim 14, wherein the air outlet comprises an annular inner casing section and an annular outer casing section which together define the interior passage and the mouth.

16. The fan assembly of claim 15, wherein the mouth comprises an outlet located between an external surface of the inner casing section and an internal surface of the outer casing section.

17. The fan assembly of claim 16, wherein the outlet is in the form of a slot.

18. The fan assembly of claim 16, wherein the outlet has a width in the range from 0.5 to 5 mm.

* * * * *